June 10, 1952  C. L. GAHAGAN  2,599,822
ROTOR HEAD FOR HELICOPTERS
Filed Oct. 11, 1947  4 Sheets-Sheet 2

Inventor
Charles L. Gahagan
By Christy, Parmelee & Strickland
Attorneys

June 10, 1952  C. L. GAHAGAN  2,599,822
ROTOR HEAD FOR HELICOPTERS
Filed Oct. 11, 1947  4 Sheets—Sheet 4

Inventor
Charles L. Gahagan

By Christy, Parmelee & Strickland
Attorneys

Patented June 10, 1952

2,599,822

UNITED STATES PATENT OFFICE 2,599,822

ROTOR HEAD FOR HELICOPTERS

Charles L. Gahagan, Greensburg, Pa.

Application October 11, 1947, Serial No. 779,312

6 Claims. (Cl. 170—135.25)

This invention pertains to heavier-than-air flying machines, and more particularly to flying machines of the type known as helicopters, and is for an improved rotor head for such a machine.

In the conventional helicopter, the rotor comprises a number of blades or air foils radiating from a rotor head that is at the top of a vertical shaft on the fuselage of the helicopter. This shaft is driven by means of an engine in the fuselage, and the rotation of the shaft causes the blades to rotate in a horizontal plane. Each blade is in the form of an air foil similar to the wing of a conventional airplane, and its movement through the air creates the lift utilized in flying the helicopter.

In translation flight, as for example the forward flight, the blades in moving from their rear fore-and-aft position to their forward fore-and-aft position are moving against the air through which the helicopter is flying. In other words, they are referred to as moving "upwind." On the other half of their circle, that is, in moving from the forward fore-and-aft position to the rearward fore-and-aft position, they are going with the air through which the helicopter is traveling, or are moving "downwind." The blade moving upwind has a greater lift than the blade moving downwind, consequently it is necessary to compensate for the change in lift in order to keep the flight smooth and the aircraft in balance. Usually the rotor has either two or four blades so that there is always one moving downwind, which is directly opposite the one moving upwind. At the present time, compensation is effected by changing the effective pitch of the blades as they move upwind or downwind. One simple way of accomplishing this is to hinge or articulate the blades so that the one moving upwind will tend to swing up at a slight angle to the horizontal plane, whereas the one moving downwind will be closer to a horizontal plane. This involves a complicated hub construction and has certain aerodynamic disadvantages aside from the purely mechanical disadvantages.

Also the conventional helicopter has what is known as a tail blade assembly which includes a variable pitch propeller-like member at the tail of the helicopter, and which faces sideways to the direction of travel of the aircraft. It is designed to create a torque opposite the direction in which the fuselage has a tendency to rotate when the engine is driving the rotor. This tail blade assembly is geared to the rotor so that all the time that the rotor is turning, the tail blade assembly is also turning. It is customary in such craft to have an over-riding clutch between the engine and the rotor shaft so that if the engine is rendered inoperative or stops, the rotor can turn freely like a windmill by the air moving against the blades, and the windmilling of the rotor will in turn create a lift so that the helicopter cannot fall at more than a predetermined speed.

The present invention provides a rotor head for helicopters in which compensation for the change in the lift of the blades as they go alternately upwind and downwind is accomplished through changing the speed of the blades relative to the drive shaft for the rotor. With such an arrangement, a wind moving downwind accelerates its speed to give a greater lift, while the wing moving upwind decelerates its speed to give a lesser lift. This is accomplished by mounting the wings individually in the head and driving each one through a properly loaded torsion spring. This effectively compensates for the upwind and downwind movement of the wings and provides a structure which is substantially more simple and aerodynamically satisfactory than present rotors.

My invention further provides a construction in which there is an over-riding clutch between the hub and the shaft, instead of between the shaft and the engine, which has certain further advantages.

My invention may be more fully understood by reference to the accompanying drawings, in which.

Figure 1:
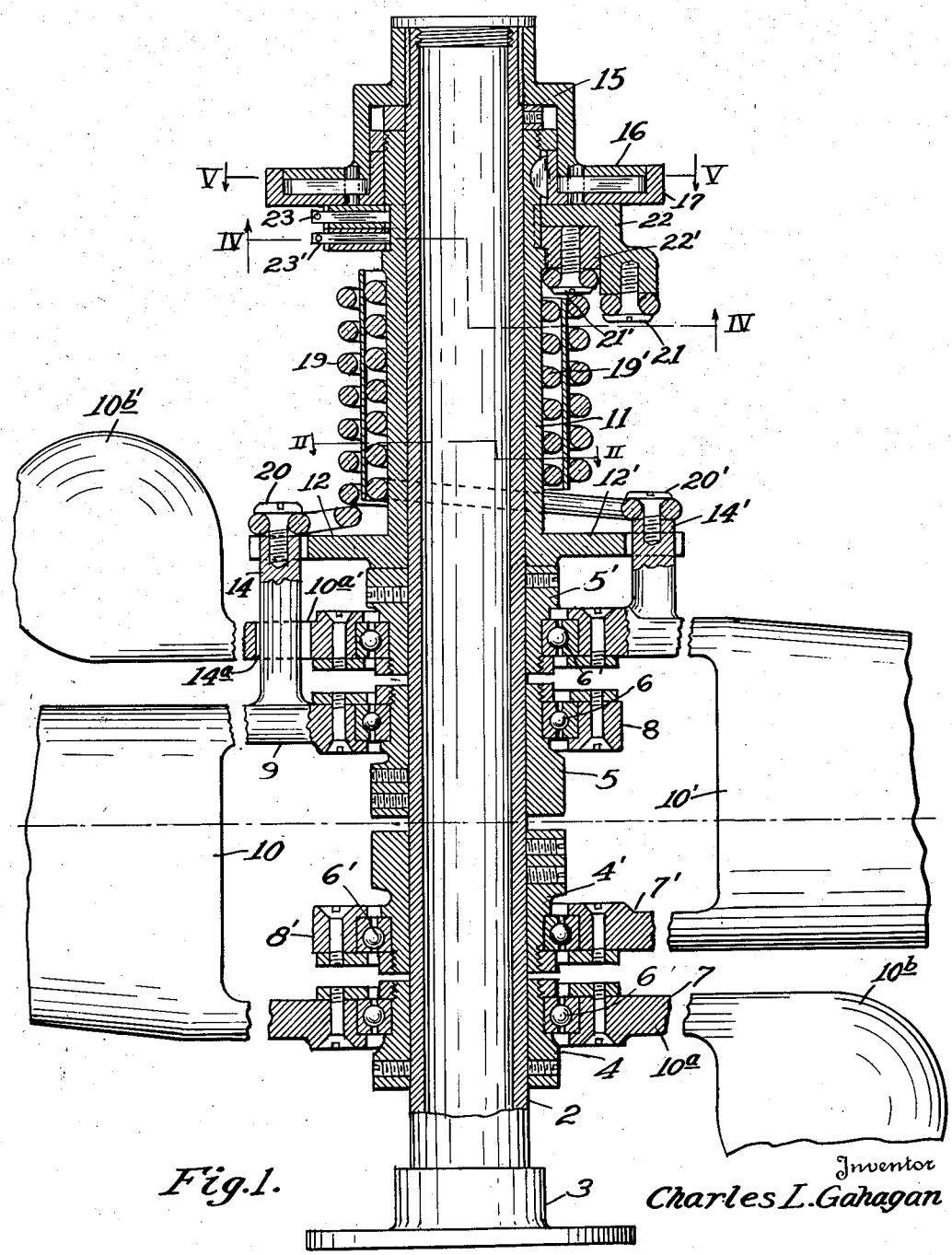
Fig. 1 is a view partly in elevation and partly in vertical section of a hub assembly embodying my invention.

In the drawings, 2 designates a tubular drive shaft. It is shown as having a flanged coupling 3 at its lower end, by means of which it can be detachably secured to the power-driven shaft at the top of the helicopter.

Secured to the shaft 2 are two collars 4 and 5, each having an anti-friction bearing 6 thereon, these collars and bearings being engaged by bearing rings 7 and 8 respectively, which are formed on arms 9 attached to a radial hub member or hub element 10. There are two other collars similar to the collars 4 and 5, but inverted, these being collars 4' and 5'. The collars 4' and 5' are likewise surrounded by bearings 6' and by bearing rings 8' on arms 7' of radial hub member or hub element 10'. I have shown a rotor having one hub member for two blades, but there may be two, three or four as desired. By reason of this arrangement, radial hubs 10 and 10' can rotate relatively to the drive shaft 2 on which they are carried.

The hub member or element 10 has a radially extending portion 10a which projects on the opposite side of the shaft from the hub 10 and which is provided with a counterweight 10b. The hub element 10' likewise has an extension 10a' with a counterweight 10b'.

Figure 2:
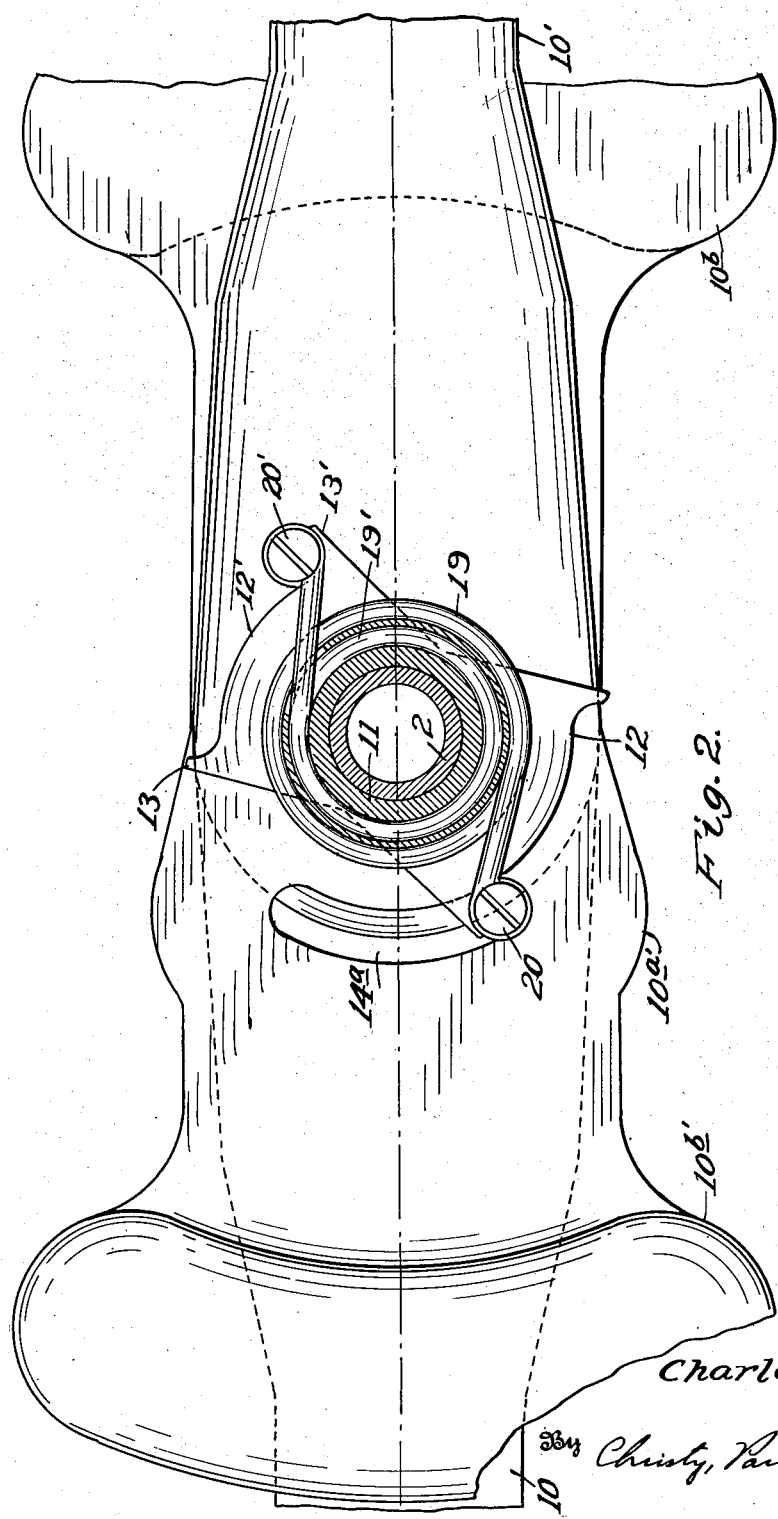
Fig. 2 is a transverse vertical section in the plane of line II—II of Fig. 1, showing two opposite blades in alignment.
Figure 3:
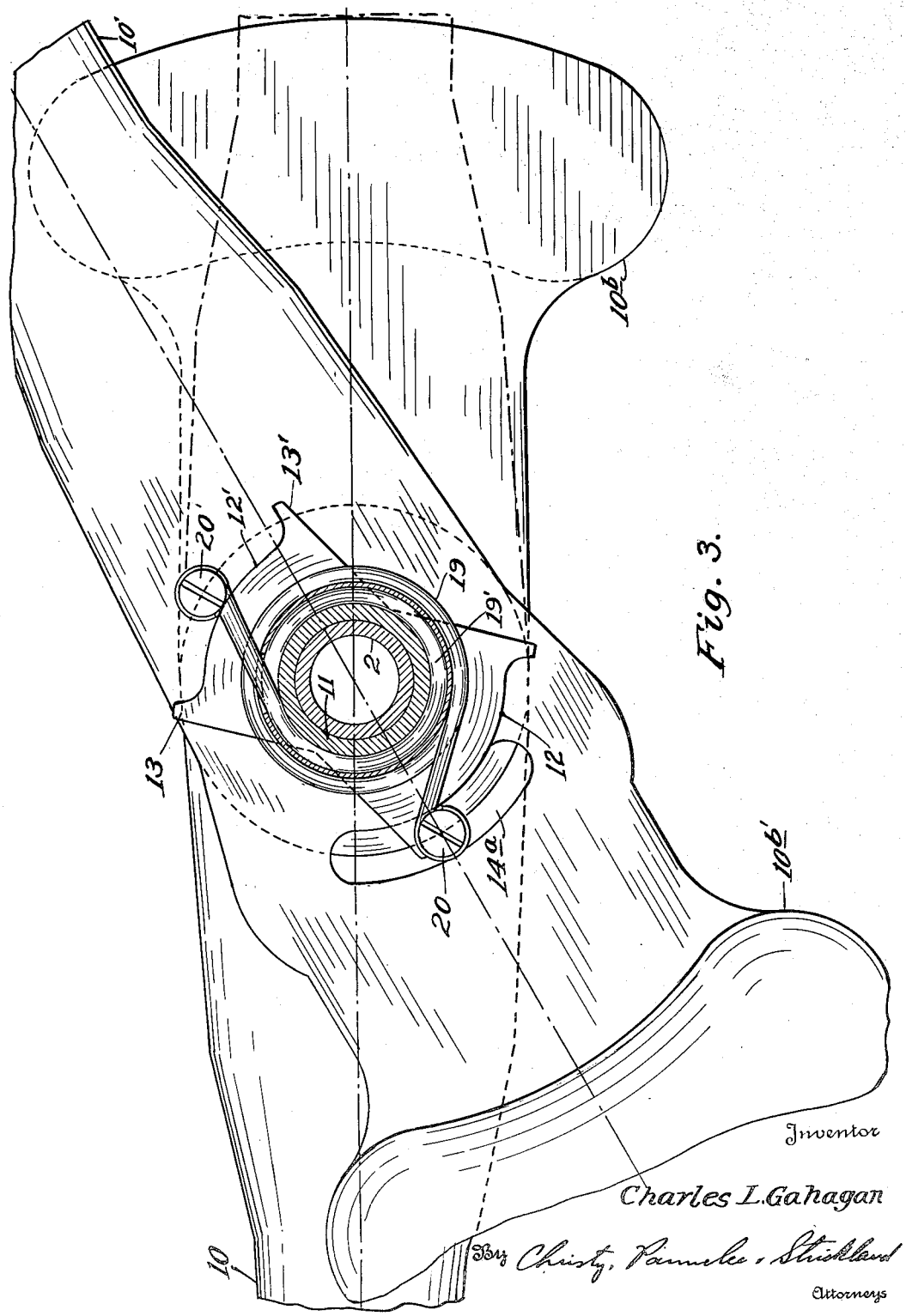
Fig. 3 is a view similar to Fig. 2, but showing relative movement between the two arms of the hub.

Fitted about the shaft 2 above the collar 5' is a sleeve 11 having two lateral projections 12 and 12' thereon. As shown in Figs. 2 and 3, these projections 12 and 12' are provided with spaced lugs 13 and 13' respectively. The hub member 10 has an upstanding post 14 thereon, the upper end of which post extends through an arcuate slot 14a in part 10a' of the blade supporting the counterweight 10b'. The upper part of this post extends between the lugs 13, and the lugs 13 limit the angular rotation of the hub 10 in reference to the sleeve 11. In other words, while the hub 10 can rotate about the shaft 2, the arc of free rotation or relative angular movement is limited by the post 14 and the lugs 13. Similarly the hub 10' is provided with a post 14' which extends upwardly past the projection 12' and is between the lugs 13' so that the lugs 13' and the post 14' limit the free rotation of the hub member 10' about the shaft 2. The importance of this arrangement is that while the hub members may move relatively to one another, the range of relative movement is limited, and the two hub members will always project in opposite directions from the shaft 2.

Figure 4:
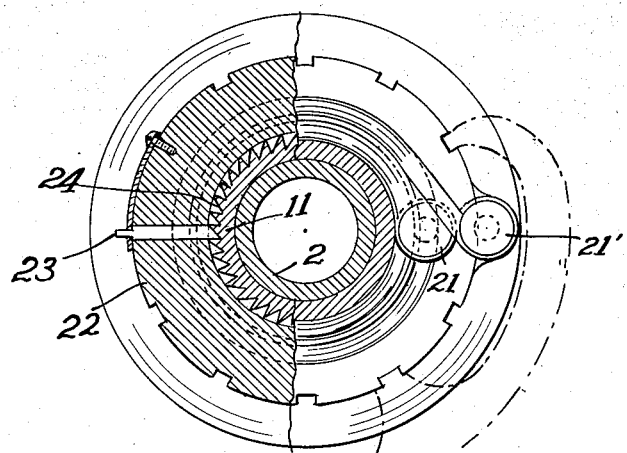
Fig. 4 is a transverse horizontal section in the plane of line IV—IV of Fig. 1.
Figure 5:
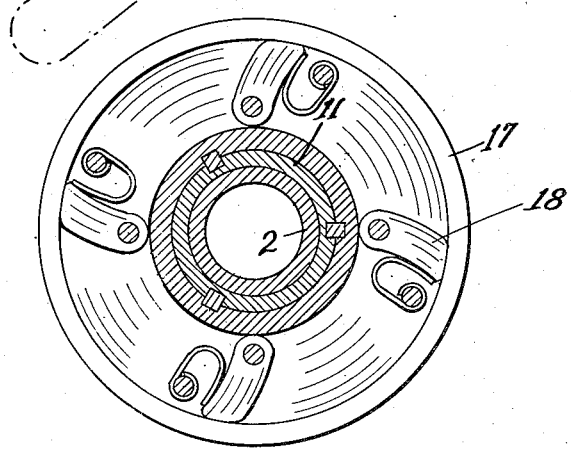
Fig. 5 is a section in the plane of line V—V of Fig. 1 showing the over-riding clutch.

Secured to the top of the shaft 2 is a driving member 15 which is keyed to the shaft for rotation with it, and which has a disc 16 forming one part of an over-riding clutch. The other part of the over-riding clutch, i. e., the driven part, is designated 17, and it is keyed to the top of the sleeve 11. The clutch may be any type of over-riding clutch. I have shown one in which the motion is transmitted by pivoted dogs 18 (see Fig. 5). The arrangement is such that the rotation of the shaft 2 will always impart motion to the member 17, but the member 17 can rotate faster than the member 16 and the shaft 2 without turning the member 16 or the shaft. A torsion spring 19, concentric about the shaft 2, has its lower end secured to the post 14, the machine screw 20 serving to anchor it to the post. Concentric with the spring 19 is another spring 19', the lower end of which is secured to the post 14' by a screw 20'. The upper end of spring 19 is connected at 21 to a collar 22 and the upper end of spring 19' is connected at 21' to a collar 22'. The collars 22 and 22' are each provided with notches on their periphery (see Fig. 4) so that they can be turned with a spanner wrench relative to the sleeve 11. The collar 22 carries a pawl 23 to engage ratchet teeth 24 on the surface of the sleeve 11 and collar 22' has a similar pawl 23' which also engages these teeth 24. By application of the spanner wrench to the collars 22, the collars may be turned in one direction to "wind" or bias the respective springs 19 and 19' to the desired extent, while the pawls 23 and 23' will then hold these collars in the position to which they are adjusted.

In the operation of the construction, when the shaft 2 is rotated, it drives the member 15 and through the over-riding clutch the member 17 is driven, which in turn rotates the sleeve 11. The rotation of the sleeve 11 effects rotation of the collars 22 and 22', applying torsion to the springs 19 and 19'. Through these springs the hub members 10 and 10' are caused to rotate with the shaft 2. The two springs 19 and 19' are so tensioned that they will both transmit approximately equal loads.

When a blade on the end of the hub 10, for example, is moving upwind, its resistance to movement is greater. Consequently the spring 19 is put under additional tension. The yielding of the spring thus allows the blade to move slightly slower through the upwind arc of its travel than the shaft 2 is turning. When the hub 10 starts traveling downwind, the resistance to the movement of the blade carried thereon will be less and the energy stored in the spring 19 will operate to accelerate the speed of the hub 10 relative to the shaft 2. The tendency of the spring to yield on the upwind travel and to accelerate the movement of the blade on the downwind travel compensates, when the springs are properly tensioned, for the variation of lift so that the aerodynamic effect of the blade is equalized in each part of its travel.

The same action of course takes place with the other hub member 10'. Because the hub members are individually movable on the shaft, the flight is smoother. Because each hub is separate, counterbalancing weights 10b and 10b' are provided.

If the shaft 2 stops rotating when the plane is in flight, the over-riding clutch 17 allows the rest of the hub structure to turn on the shaft. With the arrangement described, the torque is transmitted from the shaft to the blades individually through torsion springs, and these springs are adjusted to compensate for the change in lift on the upwind and downwind movements of the blades. The sleeve 11 carries the springs and it also carries the parts 12 and 12' with the stops 13 and 13' so that the posts 14 and 14' can only move a limited distance relatively to the sleeve 11. Hence it is never possible for one blade to get directly over the other one, and they must always be 180° apart, plus or minus the variation permitted by the spacing of the lugs 13 and 13'.

It will be understood that in the drawings I have shown the rotor head structure with the radial hub members 10 and 10' on which the wings or blades are adapted to be received, but I have not shown the wings or blades themselves. These may be rotatably mounted on the hub elements or hubs 10 and 10' in the usual manner for pitch variation, such as is required for translation flight. I have not shown the cyclical or cumulative pitch changing mechanism for changing the pitch of the blades, as any mechanism now used in the art for this purpose may be satisfactorily employed in connection with my hub construction, and such pitch changing mechanism forms no part of the present invention.

While I have illustrated and described one specific form of my invention, it will be understood that this is for purposes of illustrating the principle involved in my invention, and that my invention is not limited to the particular construction and arrangement of parts herein illustrated, but various changes and modifications may be made within the contemplation of my invention and under the scope of the following claims.

I claim:

1. A rotor head for helicopters comprising a drive shaft, a plurality of separate radially extending hub elements on the shaft and rotatable through a limited arc about the shaft, means for limiting the free range of angular movement between the hub elements and the shaft, and springs operatively connected with the respective hub elements and the shaft for transmitting motion from the shaft to the hub elements, said springs enabling the hub elements to individually vary their positions relatively to the shaft and to each other, and means on the shaft for adjusting the springs, each spring being fixed at one end with said adjusting means and at its opposite end with the hub element with which it functions.

2. A rotor head for helicopters comprising a drive shaft, a plurality of radially extending hub elements on the shaft and rotatable through a limited arc about the shaft, means for limiting the free range of angular movement between the hub elements and the shaft, and springs connected with the respective hub elements and the shaft for transmitting motion from the shaft to the hub elements, said springs enabling the hub elements to individually vary their positions relatively to the shaft, and an over-riding clutch operatively effective between the shaft and the springs for transmitting motion only from the shaft to the springs.

3. A rotor head for helicopters comprising a shaft, separate hub elements angularly adjustable about the shaft, means for limiting the range of movement of the hub elements relatively to the shaft, torsion springs concentric with the shaft for transmitting motion from the shaft to the hub elements, and means for individually adjusting the torsion springs, there being a separate torsion spring for each hub element, the springs being connected with the shaft and with their respective hub elements through an over-riding clutch that transmits motion in one direction only.

4. A rotor head for helicopters comprising a shaft having a plurality of separate hubs thereon, each hub being rotatable about the shaft, means for limiting the rotation of each hub relatively to the shaft to a limited arc, a plurality of torsion springs surrounding the shaft, each torsion spring being connected to one of the hubs, means for tensioning the torsion springs, and means for transmitting rotation of the shaft to the torsion springs, said last-named means comprising an over-riding clutch.

5. A rotor head for helicopters comprising a shaft, a sleeve surrounding the shaft, an over-riding clutch for transmitting motion from the shaft to the sleeve, said sleeve having ratchet teeth thereon, a torsion spring about the sleeve, a collar to which one end of the torsion spring is connected, said collar having a pawl thereon for engagement with said teeth, rotation of the collar relative to the sleeve serving to adjustably tension the spring, a radial blade carrying hub on the shaft below the sleeve and rotatable about the shaft as an axis, the other end of the spring being connected with said hub whereby rotation of the shaft is transmitted to the hub through said spring.

6. A rotor head for helicopters comprising a shaft, a sleeve surrounding the shaft, an over-riding clutch for transmitting motion from the shaft to the sleeve, said sleeve having ratchet teeth thereon, a torsion spring about the sleeve, a collar to which one end of the torsion spring is connected, said collar having a pawl thereon for engagement with said teeth, rotation of the collar relative to the sleeve serving to adjustably tension the spring, a radial blade carrying hub on the shaft below the sleeve and rotatable about the shaft as an axis, the other end of the spring being connected with said hub whereby rotation of the shaft is transmitted to the hub through said spring, said sleeve and hub having cooperating means for limiting the relative arcuate travel between the hub and the sleeve.

CHARLES L. GAHAGAN.

REFERENCES CITED

The following references are of record in the file of this patent:

UNITED STATES PATENTS

| Number | Name | Date |
|---|---|---|
| 1,025,658 | De Villethion | May 7, 1912 |
| 1,347,424 | Vuia | July 20, 1920 |
| 1,798,628 | Pillord | Mar. 31, 1931 |
| 2,001,736 | Larason | May 21, 1935 |
| 2,215,564 | Rask | Sept. 24, 1940 |
| 2,229,657 | Larason | Jan. 28, 1941 |
| 2,297,815 | Tidd | Oct. 6, 1942 |
| 2,352,404 | Pitcairn | June 27, 1944 |
| 2,440,956 | Kearns | May 4, 1948 |

FOREIGN PATENTS

| Number | Country | Date |
|---|---|---|
| 430,472 | Great Britain | June 19, 1935 |
| 791,525 | France | Sept. 30, 1935 |